United States Patent [19]

Kisanuki et al.

[11] Patent Number: 4,843,759
[45] Date of Patent: Jul. 4, 1989

[54] DOOR GLASS PLATE WEATHER STRIP FOR VEHICLE

[75] Inventors: Hisayuki Kisanuki; Masami Yamada, both of Aichi, Japan

[73] Assignee: Toyoda Gosei Co., Ltd., Nishikasugai, Japan

[21] Appl. No.: 30,992

[22] Filed: Mar. 27, 1987

[30] Foreign Application Priority Data

Mar. 27, 1986 [JP] Japan .................. 61-45431[U]

[51] Int. Cl.⁴ .................................................. E06B 7/16
[52] U.S. Cl. ............................................. 49/480; 49/490
[58] Field of Search .................. 49/488, 491, 490, 499, 49/480, 481

[56] References Cited

U.S. PATENT DOCUMENTS 4,584,793  4/1986  Okada .................................. 49/488
4,656,784  4/1987  Brachmann ......................... 49/491

FOREIGN PATENT DOCUMENTS 2734971  3/1978  Fed. Rep. of Germany ........ 49/490

Primary Examiner—Kenneth J. Dorner
Assistant Examiner—Gerald A. Anderson
Attorney, Agent, or Firm—Cushman, Darby & Cushman

[57] ABSTRACT

In a weather strip for vehicles which is made up of a mounting base portion for clamping the flange of a door sash, a glass plate holding portion for sealingly holding the periphery of a door glass plate, and a bend lip portion for sealingly push the door glass plate, a supporting lip is extended from the outer wall of the mounting base portion towards the inner shoulder of the glass plate holding portion, so that the glass plate holding portion is sufficiently abutted against the sash inner peripheral wall when installed and sink marks in the mounting base portion are held behind the supporting lip.

1 Claim, 2 Drawing Sheets

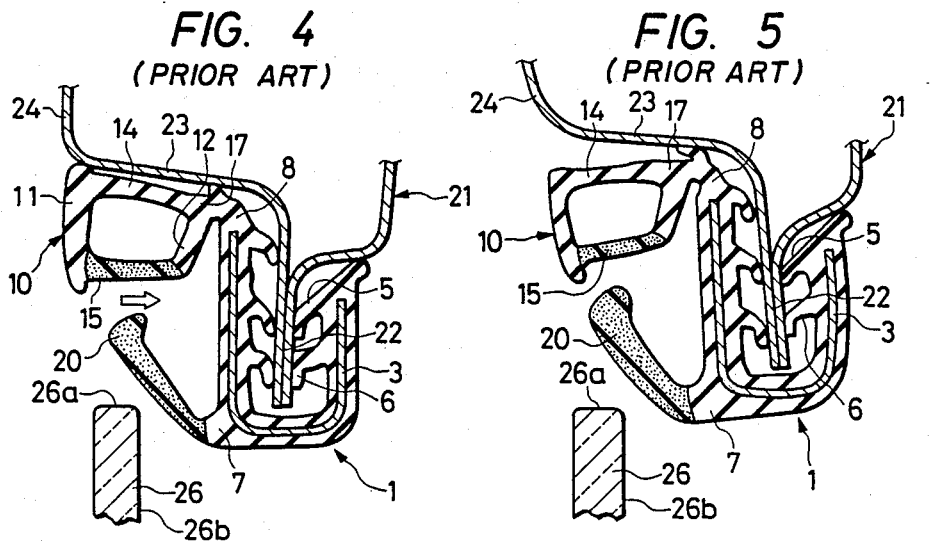
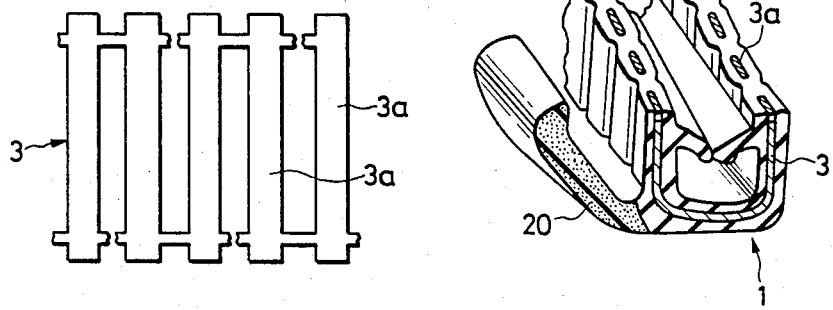
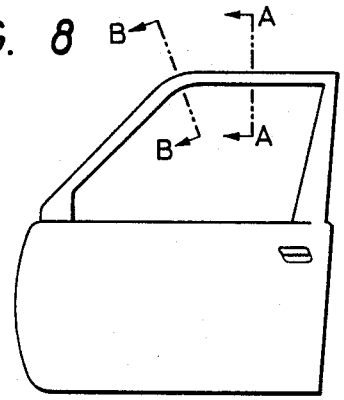

DOOR GLASS PLATE WEATHER STRIP FOR VEHICLE

BACKGROUND OF THE INVENTION

This invention relates to a door glass plate weather strip for vehicles which is generally installed closer to the roof of a vehicle.

It is desirable in order to improve the external appearance of the doors of a vehicle and to decrease the air resistance and the air shearing sound of a vehicle when run at high speed that a door glass plate weather strip is installed flush with the outer surface of a door (or the outer surface of a door sash). One example of a commercially available weather strip satisfying this requirement, as shown in FIGS. 4 and 5, comprises: a mounting base portion 1; a glass plate holding portion 10; and a bend lip portion 20.

More specifically, the mounting base portion 1 comprises an insert 3 buried in the body, and two pairs of clamping lips 5 and 6 extended inwardly for clamping the flange 22 of a door sash 21. As shown in FIG. 6, the insert 3 is made up of a number of strip-shaped members 3a which are covered with rubber and cut as illustrated so that it can be three-dimensionally deformed with ease. Thus, the mounting base portion is substantially U-shaped in section. The glass plate holding portion 10 is substantially quadrilateral in section (inverted trapezoid in FIG. 4 or 5), having an outer wall portion (becoming flush with a sash outer wall 24) 11, an inner wall portion 12, a sash engaging wall portion 14 connected between the upper edges of the two wall portion 11 and 12, and a glass plate engaging wall portion 15 connected between the lower edges of the two wall portions 11 and 12. One corner of the glass plate holding portion 10, i.e., the intersection 17 of the sash engaging wall portion 14 and the inner wall portion 12 merges with an outer free end portion 8 of the mounting base portion 1. The glass plate holding portion 10 is used to sealingly hold the peripheral portion 26a of the glass plate 26. The bend lip portion 20 has one end portion bent inwardly and the other end portion connected to an outer shoulder 7 of the mounting base portion 1. The bend lip portion 20 is used to sealingly push the inner surface 26b of the glass plate 26.

The weather strip is generally formed by extruding rubber material such as EPDM or CR or thermoplastic elastomer material of PVC or olefin group so that the glass plate engaging wall portion 15 and the bend lip portion 20 are sponge rubber (soft) and the remaining portions are of solid rubber (hard).

The conventional strip described above suffers from the following difficulties when installed on a door of a vehicle.

(1) At the straight part of the sash (line A—A in FIG. 8), the sash engaging wall portion 14 of the glass plate holding portion can be satisfactorily engaged with the sash inner peripheral wall 23 as shown in FIG. 4. However, at the corner of the sash (line B—B in FIG. 8), because of the difference in length between the inner and outer arcs the sash engaging wall portion 14 is spaced away from the sash inner peripheral wall 23 as shown in FIG. 5. This is undesirable not only from a viewpoint sealing effect but also from a viewpoint of design.

(2) As was described above, the strip-shaped elements 3a of the insert 3 buried in the mounting base portion 1 are partially connected to one another, so that sink marks are formed on the surface of the mounting base portion 1 as shown in FIG. 7. The sink marks thus formed are observed through the gap between the glass plate holding portion 10 and the bend lip portion 20 (as indicated by the white arrow in FIG. 4). Thus is undesirable from a viewpoint of design.

SUMMARY OF THE INVENTION

Accordingly, an object of this invention is to eliminate the above-described difficulties accompanying a conventional door glass plate weather strip for vehicles.

The foregoing object and other objects of the invention have been achieved by the provision of a door glass plate weather strip for vehicles which comprises: a mounting base portion substantially U-shaped in section in which an insert is buried which is made up of a number of strip-shaped elements juxtaposed in the widthwise direction, the mounting base portion adapted to clamp the flange of a door sash; a glass plate holding portion substantially quadrilateral in section which merges through one corner with the outer free end portion of the mounting base portion, the glass plate holding portion adapted to sealingly hold the peripheral portion of a door glass plate; and a bend lip portion connected to the outer shoulder of the mounting base portion, the bend lip portion adapted to sealingly push the inner surface of the door glass plate, which, according to the invention, further comprises a supporting lip extended from the outer wall of the mounting base portion towards the inner shoulder of the glass plate holding portion.

The nature, principle and utility of the invention will become more apparent from the following detailed description when read in conjunction with the accompanying drawings, in which like parts are designated by like reference numerals or characters.

BRIEF DESCRIPTION OF THE DRAWINGS

In the drawings;

FIG. 4 is a sectional view for a description of the installation of a conventional weather strip at the straight part of the vehicle door sash;

FIG. 5 is a sectional view for a description of the installation of the conventional weather strip at the corner part of the vehicle door sash;

FIG. 6 is a plan view of an insert made up of a number strip-shaped elements which are cut as shown;

FIG. 7 is a perspective view, with parts cut away, of the weather strip shown in FIG. 4; and FIG. 8 is a side view of a door of a vehicle.

DETAILED DESCRIPTION OF THE PREFERRED EMBODIMENT

Figure 1:
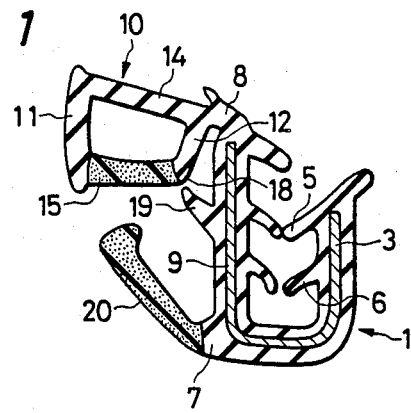
FIG. 1 is a sectional view showing one example of a weather strip according to this invention.
Figure 2:
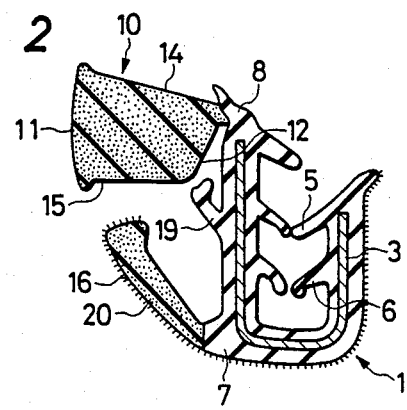
FIG. 2 is a sectional view showing another example of the weather strip according to the invention.
Figure 3:
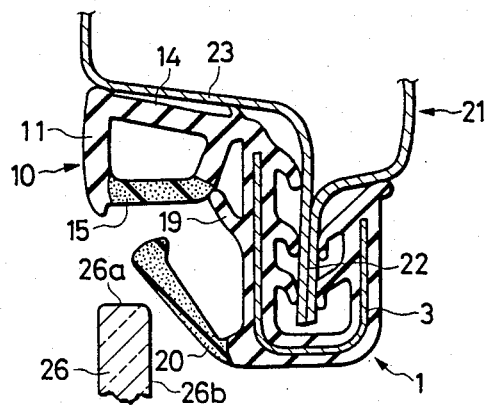
FIG. 3 is a sectional view for a description of the installation of the weather strip of FIG. 1 at the corner part of a vehicle door sash.

Preferred embodiments of this invention will be described with reference to FIG. 1 through FIG. 3. In FIGS. 1 through 3, parts corresponding functionally to those which have been already described FIGS. 4 through 7 are designated by corresponding reference numerals or characters.

A first example of a door glass plate weather strip according to the invention is as shown in FIG. 1. The weather strip shown in FIG. 1 is obtained by modifying the above-described conventional weather strip as follows: A supporting lip 19 is extended from the outer wall surface 9 of the mounting base portion 1 towards the inner shoulder 18 of the glass plate holding portion 10, i.e., the intersection of the inner wall portion 12 and the glass plate engaging wall portion 15 in such a manner that the supporting lip 19 and the outer wall surface 9 of the mounting base portion 1 form an angle of 30° to 60°. The configuration of the supporting lip 19 may be such that the thickness is larger towards the end or smaller towards the end. Alternatively, the supporting lip 19 may be bent as shown in FIG. 2. In any case, the supporting lip 19 is formed as a solid rubber portion (hard) when the weather strip is formed by extrusion.

In the weather strip shown in FIG. 1, the glass plate holding portion 10 is hollow. However, the glass plate holding portion may be modified into a substantially solid one which is made of sponge rubber as shown in FIG. 2.

In order to improve the design and the sealing effect of the weather strip, a number of spine-like protrusions 16 may be extended from the outer surfaces of the mounting base portion 1 and the bend lip portion 20, or a colored rubber layer may be formed on the surface.

The installation of the weather strip according to the invention will be described.

The weather strip is engaged with the door sash 21 by clamping the sash flange 22 with the mounting base portion 1. In this operation, at the straight part of the sash (line A—A in FIG. 8) the sash engaging wall portion 14 of the glass plate holding portion 10 is sufficiently abutted against the sash inner peripheral wall 23, that is, no gap is formed therebetween. At the corner of the sash (line B—B of FIG. 8), similarly as in the conventional weather strip, because of the difference in length between the inner and outer arcs the glass plate holding portion 10 tends to fall inwardly to cause the sash engaging wall portion 14 to move away from the sash inner peripheral wall 23; however, the supporting lip 19 prevents the glass plate holding portion 10 from fall inwardly, and therefore the sash engaging wall portion 14 is also prevented from moving away from the sash inner peripheral wall 23. Similarly as in the case of the conventional weather strip, the inside of the weather strip can be observed through the gap between the glass plate holding portion 10 and the bend lip portion 20; however, the sink marks on the mounting base portion, being behind the supporting lip 19, cannot be observed from outside normal conditions.

As was described above, in the weather strip of the invention, the supporting lip is extended from the outer wall portion of the mounting base portion towards the inner shoulder of the glass plate holding portion. The supporting lip thus extended prevents the glass plate holding portion from falling inwardly at the corner of the sash, thus eliminating the formation of the gap between the sash engaging wall portion 14 of the glass plate holding portion 10 and the sash inner peripheral wall 23 which is undesirable not only from a viewpoint of design but also from a viewpoint of sealing effect. Furthermore, the supporting lip thus provided prevents the sink marks on the mounting base portion from appearing through the gap between the glass plate holding portion and the bend lip portion.

What is claimed is:

1. A door glass weather strip for vehicles which comprises:

a mounting base portion substantially U-shaped in section in which an insert is buried which is made up of a number of strip-shaped elements juxtaposed in the widthwise direction, said mounting base portion adapted to clamp the flange of a door sash;

a glass plate holding portion substantially quadrilateral in section which merges at one corner thereof with an outer free end portion of said mounting base portion, said glass plate holding portion adapted to sealingly hold the peripheral portion of a door glass plate;

a bend lip portion connected to an outer shoulder of said mounting base portion, said bend lip portion adapted to sealingly push the inner surface of said door glass plate; and supporting lip means extending from an outer wall portion of said mounting base portion towards an inner shoulder of said glass plate holding portion, said supporting lip means being free from attachment with said glass plate holding portion, said supporting lip means supporting said glass plate holding portion by abutting contact herewith along portions of said door sash where said glass plate holding portion tends to be displaced downwardly from engagement with said door sash.

* * * * *